(12) United States Patent
Hayashi (10) Patent No.: US 7,925,146 B2
(45) Date of Patent: Apr. 12, 2011

(54) IMAGE BLUR CORRECTION DEVICE AND IMAGING DEVICE USING SAME

(75) Inventor: Naohiko Hayashi, Izumi (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

(21) Appl. No.: 12/635,805

(22) Filed: Dec. 11, 2009

(65) Prior Publication Data
US 2010/0209087 A1 Aug. 19, 2010

(30) Foreign Application Priority Data

Feb. 19, 2009 (JP) ................................ 2009-036676

(51) Int. Cl.
G03B 5/00 (2006.01)
G03B 17/00 (2006.01)
(52) U.S. Cl. ...................................... 396/55; 348/208.7
(58) Field of Classification Search .................... 396/52, 396/55; 348/208.7, 208.11
See application file for complete search history.

(56) References Cited

U.S. PATENT DOCUMENTS

| 6,064,827 | A | * | 5/2000 | Toyoda | 396/55 |
| 7,623,151 | B2 | * | 11/2009 | Noguchi | 348/208.11 |
| 7,783,179 | B2 | * | 8/2010 | Takahashi | 396/55 |
| 7,783,181 | B2 | * | 8/2010 | Jang et al. | 396/55 |
| 2005/0046975 | A1 | * | 3/2005 | Katagishi et al. | 359/819 |
| 2008/0291540 | A1 | * | 11/2008 | Nakamura et al. | 359/554 |
| 2009/0059372 | A1 | * | 3/2009 | Kawauchi et al. | 359/554 |

FOREIGN PATENT DOCUMENTS

| JP | 11271833 | A | * | 10/1999 |
| JP | 2003337361 | A | * | 11/2003 |
| JP | 2005249810 | A | * | 9/2005 |
| JP | 2008-233385 | A |   | 10/2008 |

* cited by examiner

Primary Examiner — Clayton E LaBalle
Assistant Examiner — Leon W. Rhodes
(74) Attorney, Agent, or Firm — Sidley Austin LLP (57) ABSTRACT

In an image blur correction device and an imaging device according to the present invention, a holder for holding an optical component, which is displaced for correcting an image blur, is supported by one or more balls, so as to be freely displaced by sliding on the base, and has a structure to restrict the movement of the holder within a range, which is smaller than a mobile range normally acquired when the ball is assembled, if the ball is omitted in an assembly. Therefore the image blur correction device and the imaging device having this configuration can detect the missing of a ball in an assembly.

18 Claims, 9 Drawing Sheets

FIG. 9 ed and secured with the
IMAGE BLUR CORRECTION DEVICE AND IMAGING DEVICE USING SAME

BACKGROUND OF THE INVENTION

1. Field of the Invention

The present invention relates to an image blur correction device for optically correcting the image blur of a camera, and an imaging device using same.

2. Description of the Background Art

An image blur is a disturbance of a photographed image that is generated by the micro-vibration of the camera when an image is photographed by the camera. When a camera is handled by human hands, for example, this micro-vibration is generated by a human body motion of which cycle is relatively long, or by a tremor of human hands and fingertips of which cycle is relatively short. An image blur correction device for a camera, which has the merit of allowing a night shot without a tripod by the slow shutter function is more and more frequently installed in a camera. An optical correction feature, which optically corrects image blur, has a particular advantage in terms of resolution over an electronic correction feature, which electronically corrects image blur, therefore the former is the standard as an image blur correction device. One optical image blur correction method is an image blur correction method that displaces such optical components as a correction lens disposed among lenses and an image sensing element disposed in the camera main body in a direction perpendicular to the optical axis.

For example, Japanese Patent Application Laid-Open No. 2008-233385 (D1) discloses an image blur correction device which corrects image blur at the lens side. In the image blur correction device disclosed in document D1, the correction lens is supported by a holder and is inserted into the optical system, and a coil, that is an actuator for displacement, is displaced at one end of the holder, and a ball is disposed at the other end, where a drive force is generated with a permanent magnet disposed in a fixed position by energizing the coil, so that the correction lens displaces in a direction perpendicular to the optical axis.

A problem of the above configuration is that if the ball is not inserted in the assembly step, then it is difficult to detect this absence since the clearance that is lost by this omission is small (the unit itself is small). Even if the absence of the ball can be detected, this requires a difficult inspection procedure, which means that the absence of a ball is unnoticed until optical performance is checked. In other words, this detection is possible only when defocus and blur are generated at the ball side in test photographing. Because of this, a defective unit may enter into subsequent steps, causing problems latter. In the case of image blur correction at the main body side, an image blur correction mechanism is disposed in the sensor unit of the image sensing element, but if a tilt (optical axis) adjustment mechanism is disposed between the image blur correction mechanism, in which the sensor unit is installed, and a lens barrel, the above mentioned defocus and blur, due to the absence of a ball, are corrected by the tilt adjustment, and the camera having this defective unit may be shipped.

SUMMARY OF THE INVENTION

With the foregoing in view, it is an object of the present invention to provide an image blur correction device using a ball that can detect the omission of the ball that occurred during assembly, and an imaging device adopting the same.

In the image blur correction device and imaging device according to the present invention, a holder for holding an optical component, that is displaced for correcting image blur, is supported by one or more balls so as to be freely displaced by sliding on a base, and has a structure to restrict movement of the holder within a range, that is smaller than a mobile range normally acquired when the ball is inserted, if omission of the ball occurred during assembly. Therefore the image blur correction device and the imaging device having this configuration can detect the omission of the ball that occurred during assembly.

These and other objects, features and advantages of the present invention will become more apparent upon reading the following detailed description along with the accompanying drawings.

DESCRIPTION OF THE PREFERRED EMBODIMENTS

Embodiments of the present invention will now be described with reference to the drawings. In each drawing, composing elements denoted with a same reference symbol are the same composing elements, and description thereof is omitted as appropriate.

Figure 1:
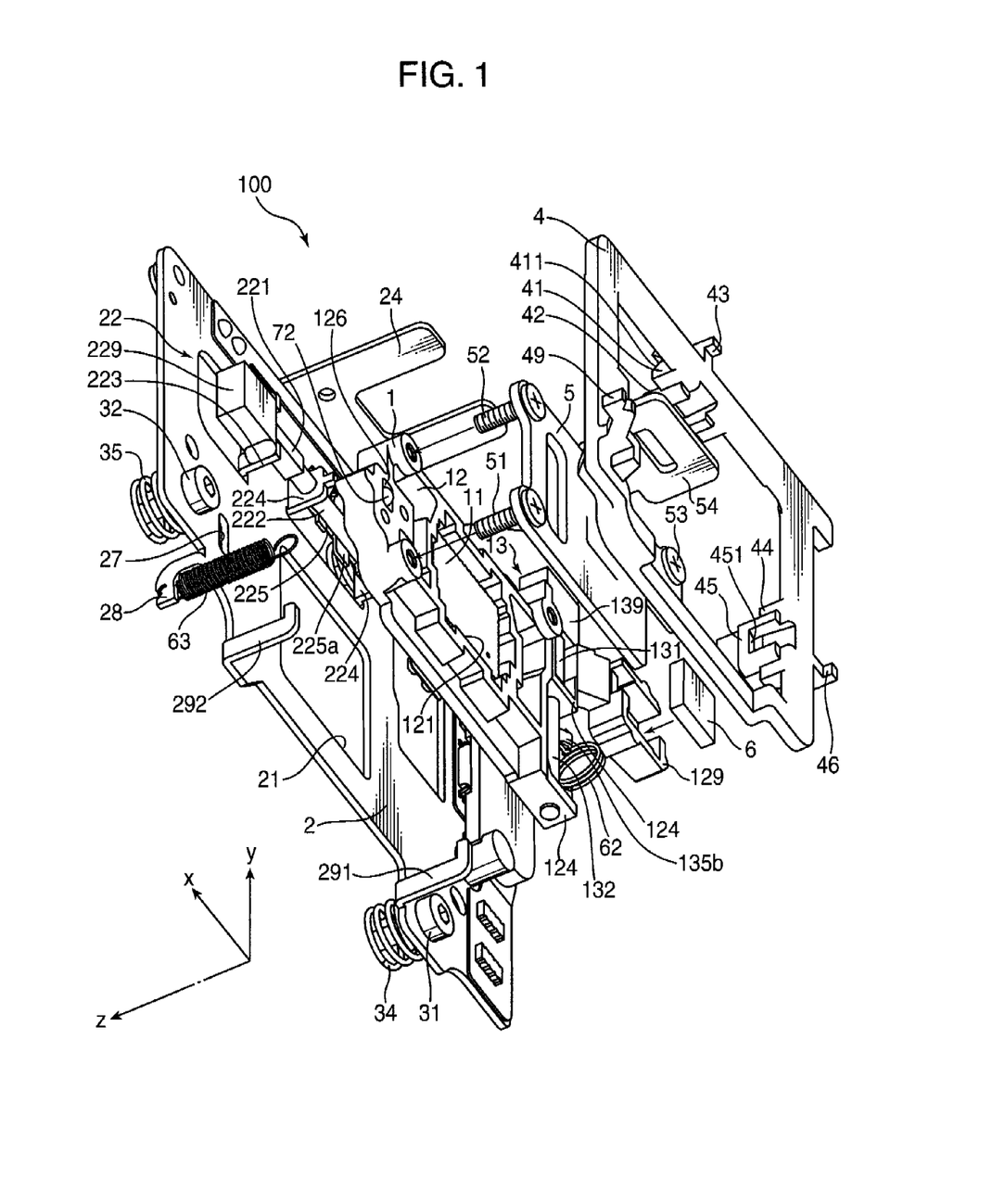
FIG. 1 is a perspective view depicting an image blur correction unit according to an embodiment of the present invention, when viewed upward from the lower left of the rear face.
Figure 2:
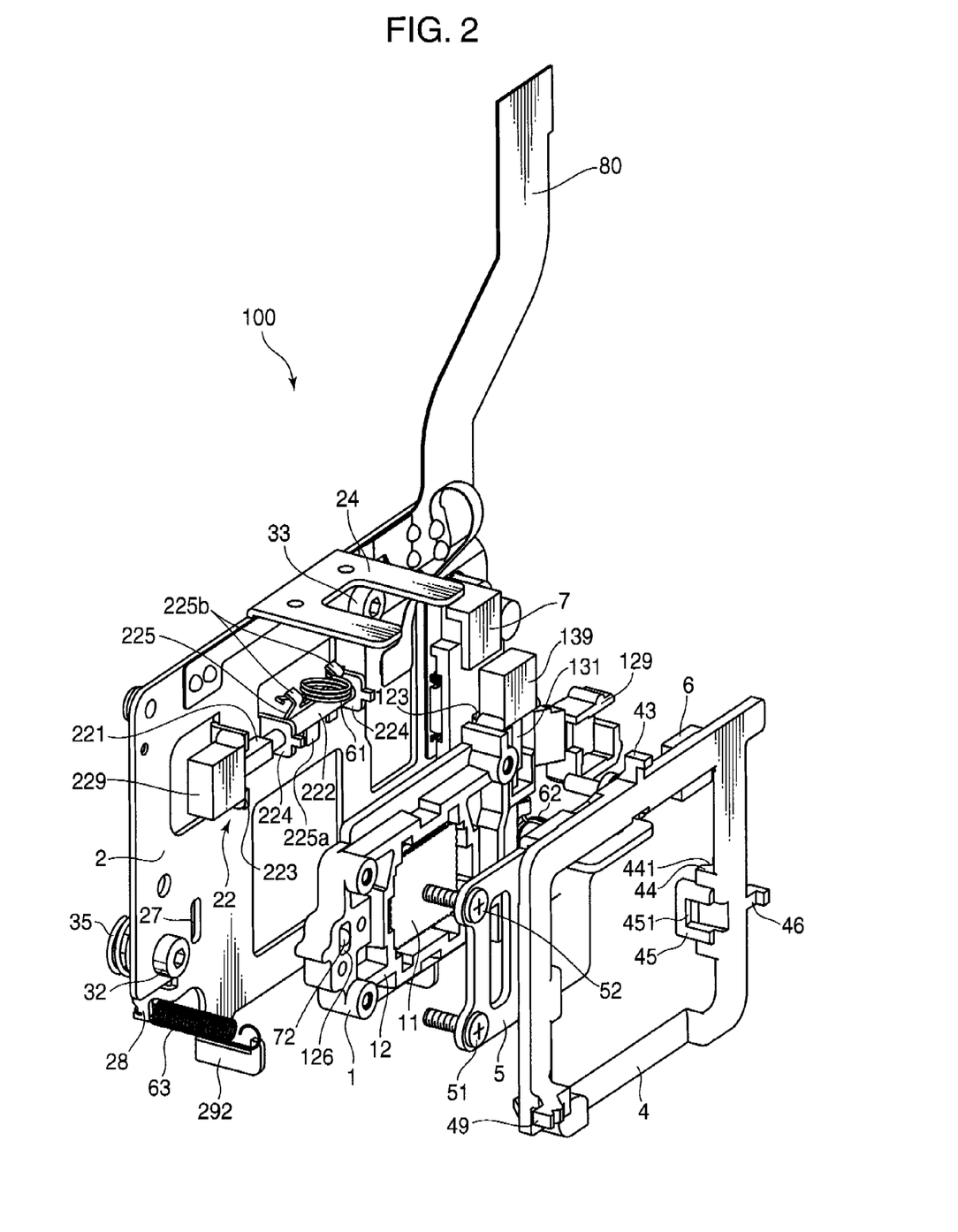
FIG. 2 is a perspective view depicting the image blur correction unit shown in FIG. 1, when viewed downward from the upper left of the rear face.
Figure 3:
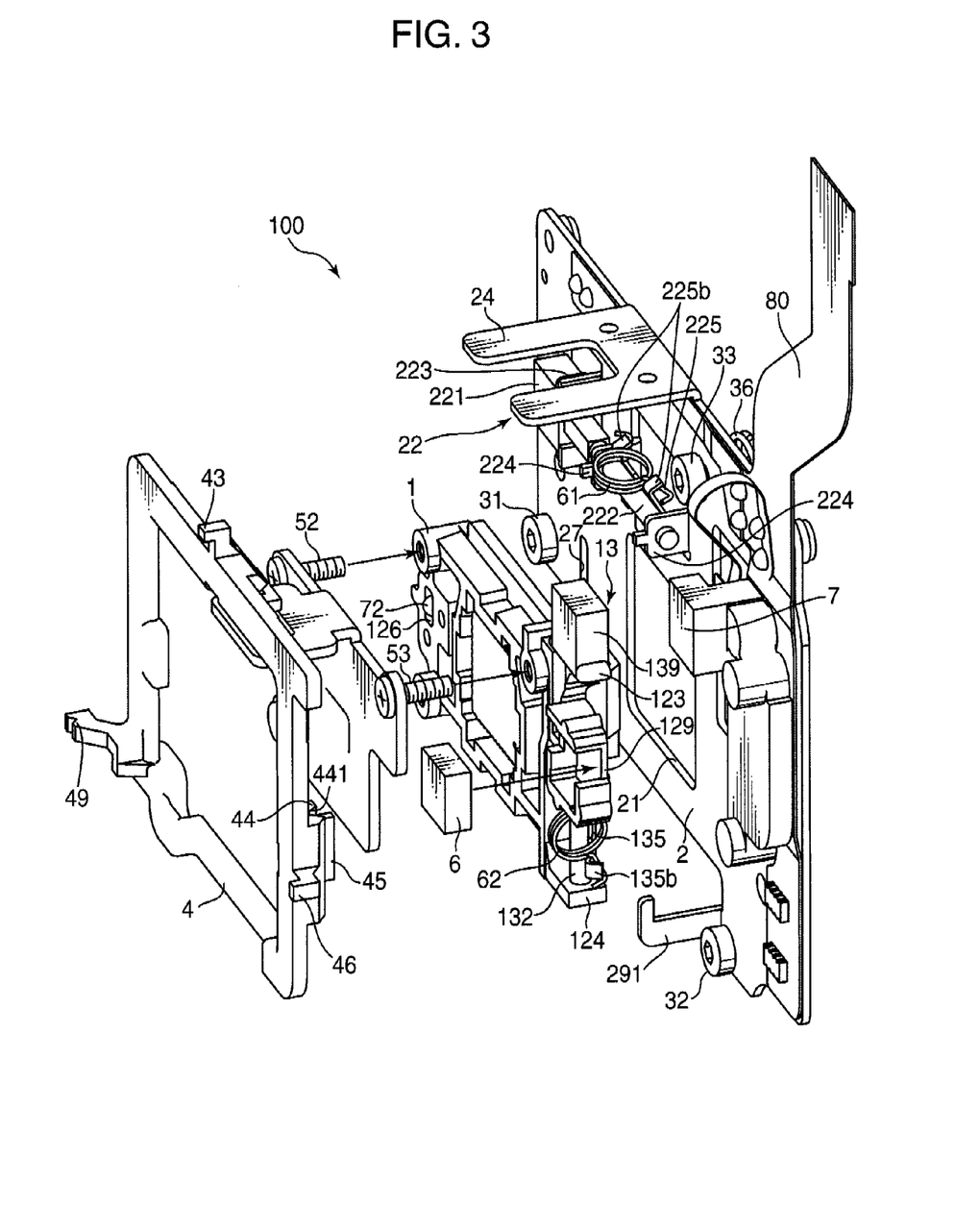
FIG. 3 is a perspective view depicting the image blur correction unit shown in FIG. 1 when viewed downward from the upper right of the rear face.
Figure 4:
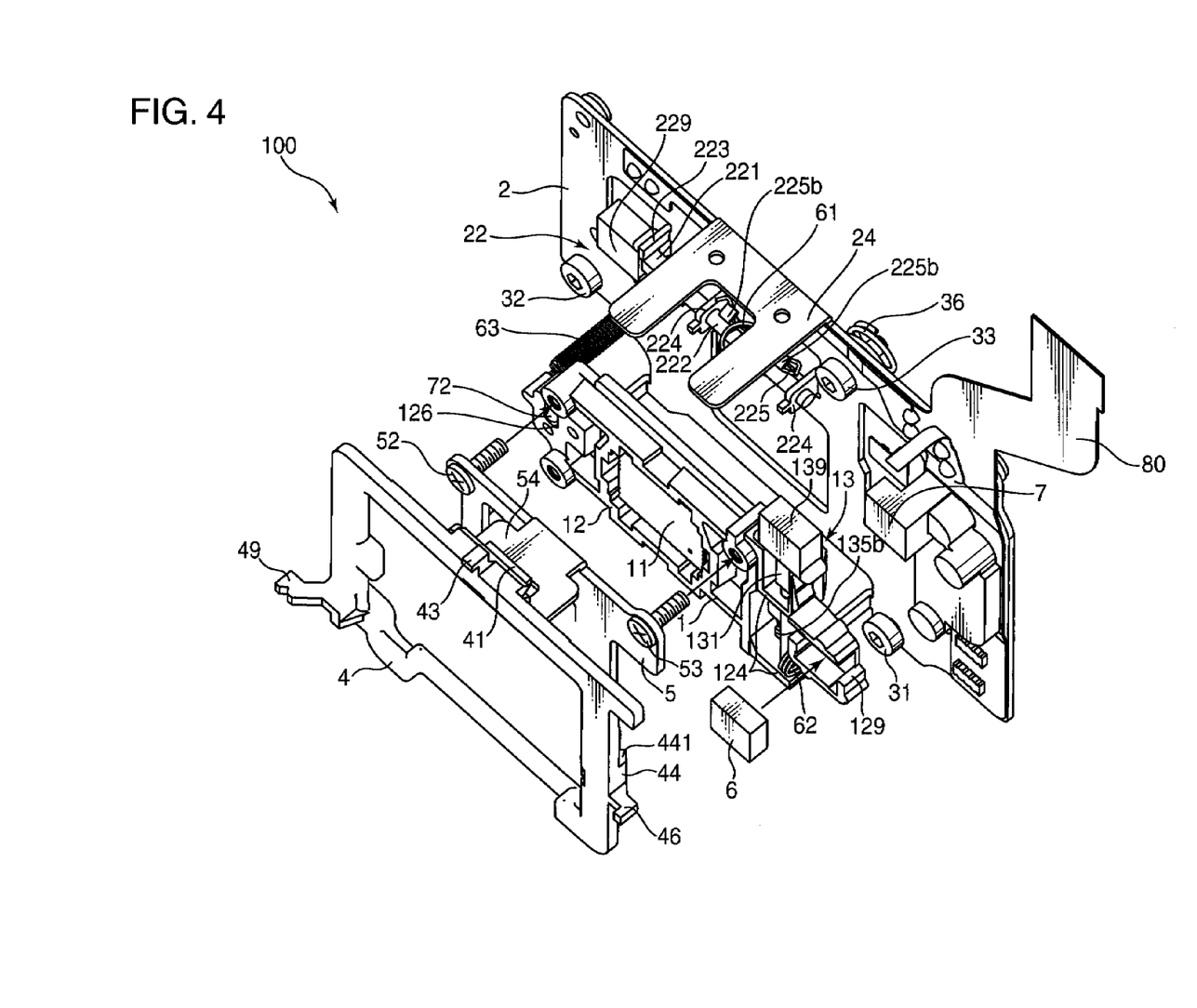
FIG. 4 is a perspective view depicting the image blur correction unit shown in FIG. 1 when viewed downward from the upper right of the rear face.
Figure 5:
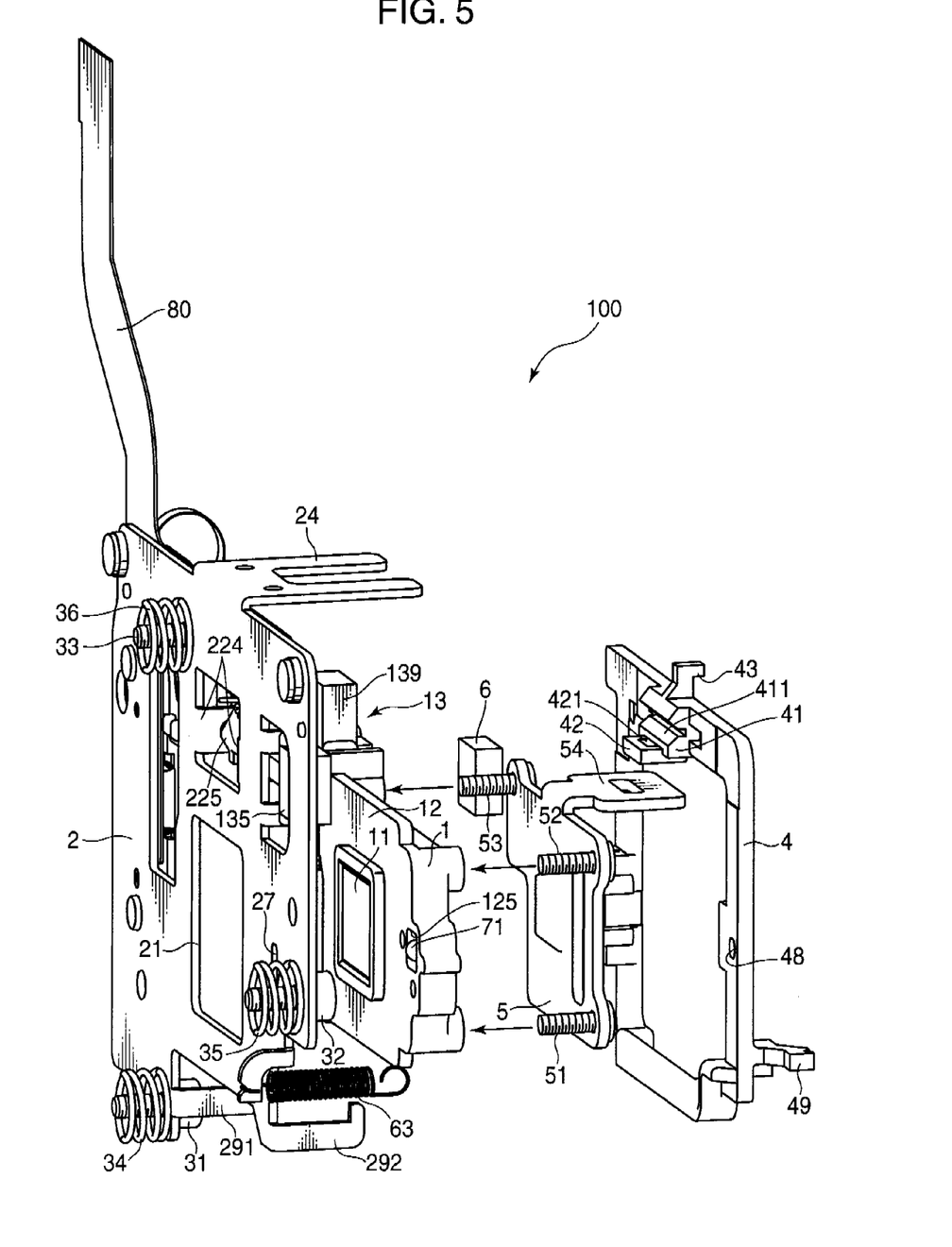
FIG. 5 is a perspective view depicting the image blur correction unit shown in FIG. 1 when viewed downward from the right of the front face.
Figure 6:
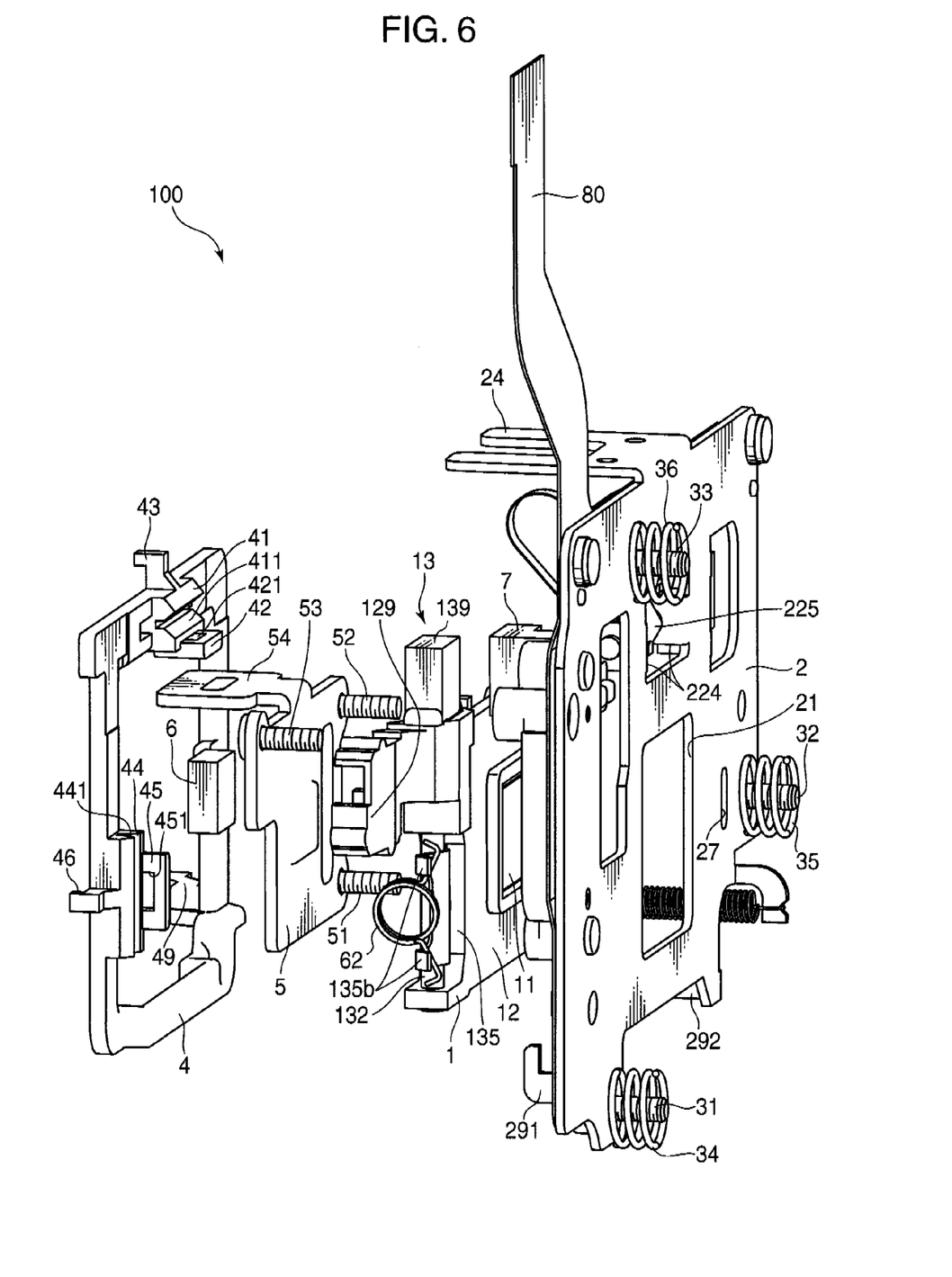
FIG. 6 is a perspective view depicting the image blur correction unit shown in FIG. 1 when viewed downward from the left of the front face.
Figure 8:
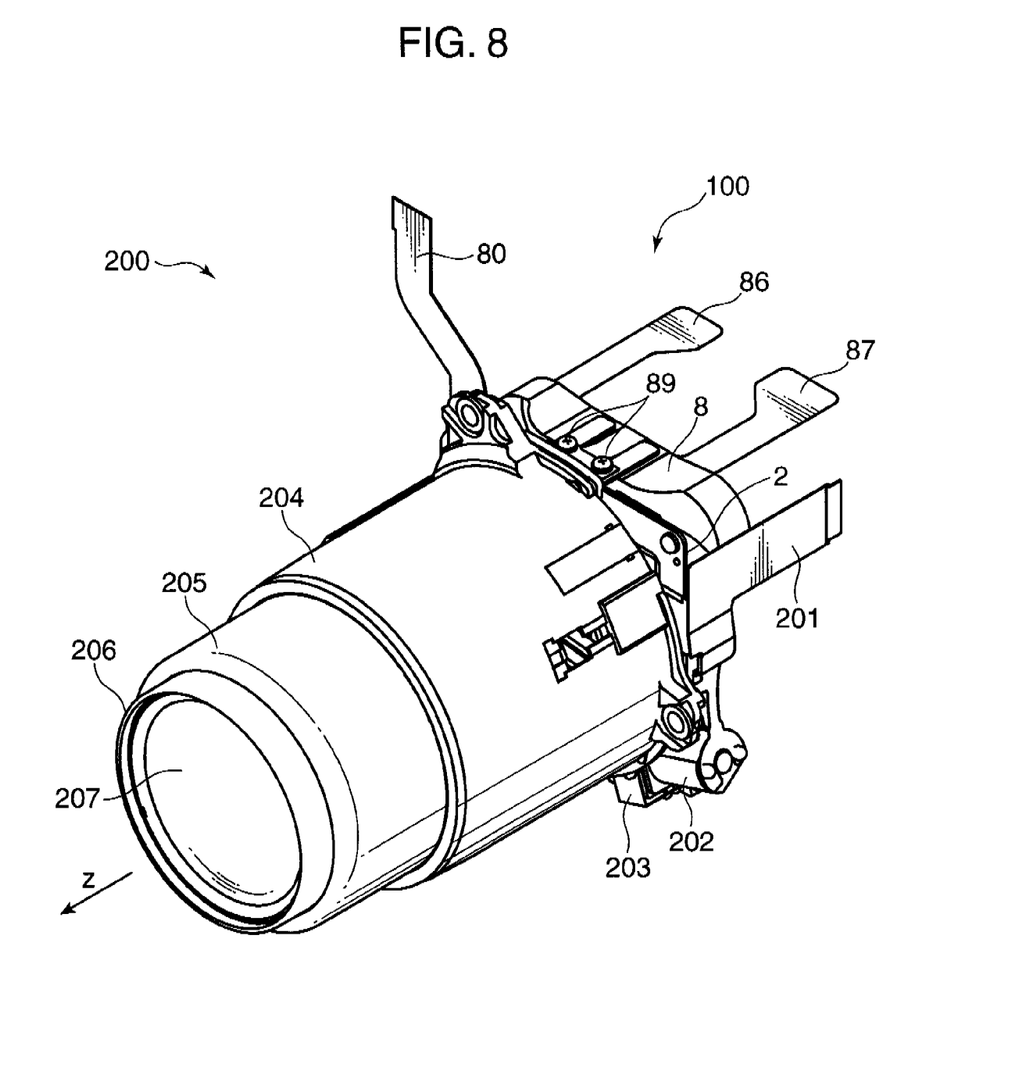
FIG. 8 is a perspective view from the front face side depicting an imaging device comprising the image blur correction unit shown in FIG. 1 and an imaging lens barrel.
Figure 9:
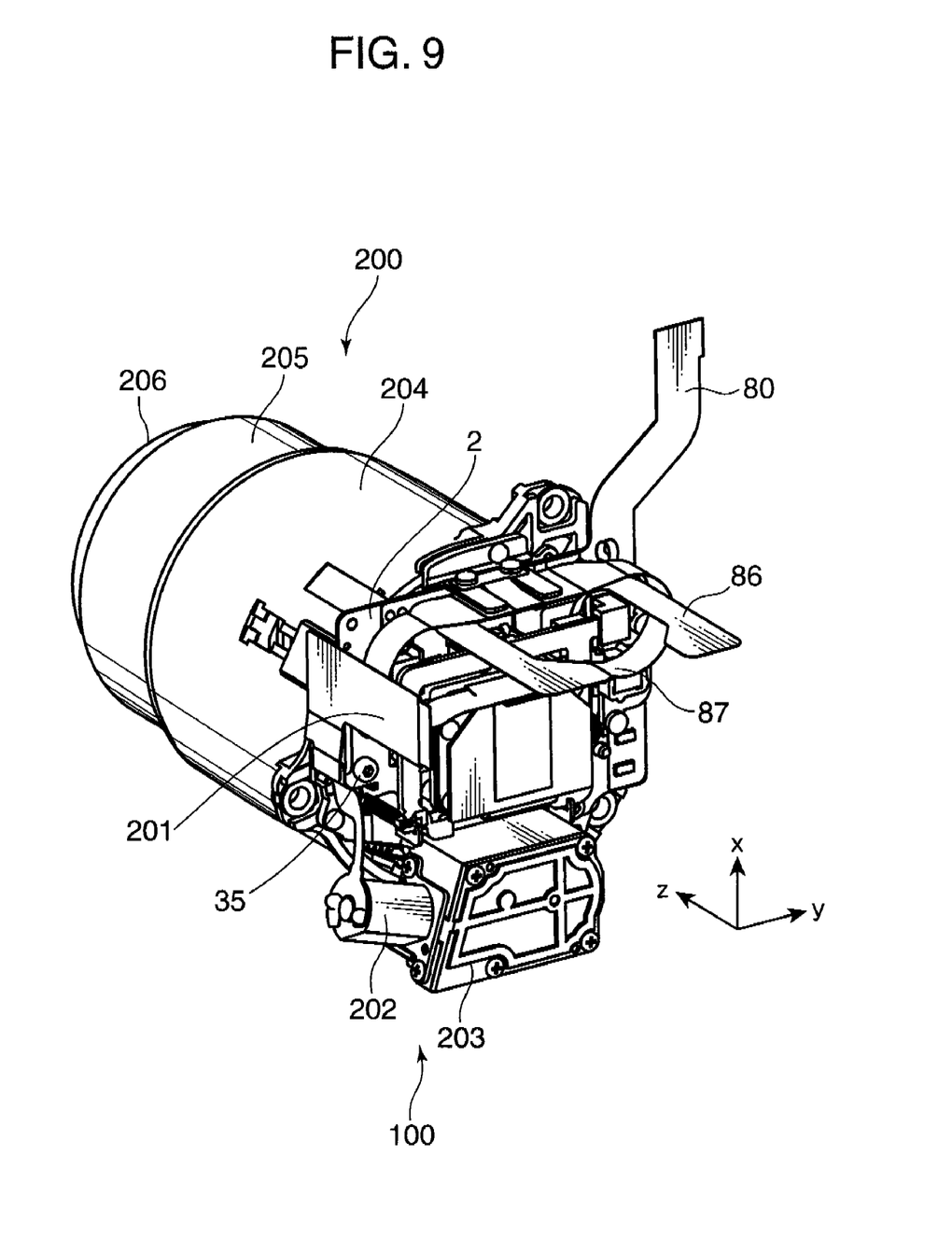
FIG. 9 is a perspective view from the rear face side, depicting the imaging device comprising the image blur correction unit shown in FIG. 1 and the imaging lens barrel.

FIG. 1 to FIG. 6 are perspective views depicting an image correction unit 100 according to an embodiment of the present invention, where FIG. 1 depicts the view upward from the lower left of the rear face, FIG. 2 depicts the view downward from the upper left of the rear face, FIG. 3 depicts the view downward from the upper right of the rear face, FIG. 4 depicts the view downward from the upper right of the rear face, FIG. 5 depicts the view downward from the right of the front face, and FIG. 6 depicts the view downward from the left of the front face. As FIG. 8 and FIG. 9 show later, this image blur correction unit 100 is integrated and secured with the imaging lens barrel 200, and is used for the camera, and optically corrects a sensor unit 1 including an image sensing element 11 in the x direction and y direction, which are perpendicular to an optical axis z (see FIG. 1). This image blur correction unit 100 is used for a single lens camera of which lens cannot be removed.

A stationary element 2, which is a first base constituted by sheet metal, is disposed at the front face side of the camera main body. In this stationary element 2, three screw holes (not illustrated) for three screws 31 to 33 are formed at each vertex position of a triangle. After the image blur correction unit 100 is assembled, an imaging lens barrel 200 is secured to this stationary element 2, without rattle, by these three screws 31 to 33, and springs 34 to 36 that are wound around the three screws. For the tilt adjustment, the screws 31 to 33 are adjusted by a hexagonal wrench so that the optical axis z of the sensor unit 1 and the optical axis of the imaging lens barrel 200 match. After the tilt adjustment, these screws 31 to 33 are bonded to the stationary element 2, so as to prevent loosening of the screws 31 to 33. Light enters from the imaging lens barrel 200 via the rectangular opening 21 created in the stationary element 2, and forms an image on the imaging element 11.

The sensor unit 1 is held between the stationary element 2 that is disposed at the front face side of the sensor unit 1 and a slider 4 that is disposed at the rear face side of the sensor unit 1, and can be displaced by sliding, along with the slider 4, on the stationary element 2 in the x direction, and the slider unit 1 alone is also supported so as to be freely displaced by sliding in the y direction with respect the slider 4. The slider 4 is the second base, and is constituted by a die cast molded product, for example.

A light sensing element 11 is constituted by a CCD image sensor or CMOS image sensor, for example, and an FPC is attached to the rear face side thereof. In FIG. 1 to FIG. 6, the FPC, on which many wires are formed and chip components are mounted, is omitted to simplify the drawings. The image sensing element 11 mounted on the FPC like this is inserted into a concave portion 121, which is formed in the holder 12, from the rear face side, and then a shield plate 5 is installed on the rear face side of the image sensing element 11 by screws 51 to 53 that are screwed into the holder 12, so as to be firmly secured to the holder 12, and the sensor unit 1 is completed. The holder 12 is constituted by a resin molded product, for example, and the shield plate 5 is constituted by a sheet metal processed product, for example.

A support portion 54 formed at the top end of the shield plate 5 holds and secures the extended portion of the FPC from the image sensing element 11, and a support portion 24 formed at the top end of the stationary element 2 routes the FPC so that the FPC changes direction, and extends out from the image correction unit 100.

In order to implement sliding displacement in the x direction, that is a first direction, an ultrasonic linear actuator 22 is disposed at the stationary element 2 side. This ultrasonic linear actuator 22 has a piezoelectric element 221 which extends in the x direction, a rod 222 which extends from the piezoelectric element 221 in the x direction, and a weight 229. The weight 229 is secured on the stationary element 2 by a bracket 223, and one end of the piezoelectric element 221 is adhered to the weight 229, and the rod 222 is adhered to the other end of the piezoelectric element 221. The rod 222 is supported by the stationary element 2 using a pair of brackets 224 disposed at a predetermined interval, so as to be freely displaced in the x direction. Corresponding to the rod 222, a strip-shaped receive element 225, of which cross-section perpendicular to the x direction has a V shape, is disposed in the front face side, and a sliding portion 41 having a V groove 411, that extends in the x direction, is disposed on the top end of the slider 4. An engaging piece 225a disposed on one side of the strip-shaped receive element 225 is inserted into a concave portion 421 of a support piece 42 that is disposed adjacent to the sliding portion 41, and by a spring 61 that is wound between a pair of engaging pieces 225b disposed on the other side of the receive element 225, and a hook 43 disposed on the top end of the slider 4, the sensor unit 1 is sandwiched between the slider 4 and the stationary element 2, so that sliding displacement in the x direction is possible.

In the ultrasonic linear actuator 22 having this configuration, if the piezoelectric element 221 slightly extends the rod 222 in the extending direction from the weight 229 as a base, and instantaneously retracts the rod 222 in the contracting direction (opposite direction of the extending direction), then the support piece 42 remains in the extended position, and the slider 4 and the sensor unit 1 connected to the slider 4 are displaced in the extending direction by repeating this operation. If the piezoelectric element 221 instantaneously extends the rod 222 in the extending direction and gently retracts the rod 222, on the other hand, the support piece 42 is retracted to the retracted position, and the slider 4 and the sensor unit 1 connected to the slider 4 are displaced in the retracting direction by repeating this operation.

Then in order to implement the sliding displacement in the y direction, that is a second direction, an ultrasonic linear actuator 13 is disposed at the right side of the rear face of the holder 12. Just like the above mentioned ultrasonic linear actuator 22, this ultrasonic linear actuator 13 has a piezoelectric element 131 that is retractable in the y direction, a rod 132 which extends from the piezoelectric element 131 in the y direction, and a weight 139. The weight 139 is secured on the holder 12 by a bracket 123, and one end of the piezoelectric element 131 is adhered to the weight 139, and the rod 132 is adhered to the other end of the piezoelectric element 131. The rod 132 is attached to the holder 12 by a pair of brackets 124, which are disposed at a predetermined interval so as to be freely displaced in the y direction. Corresponding to the rod 132, a strip-shaped receive element 135, of which cross-section perpendicular to the y direction has a V shape, just like the receive element 225, is disposed at the front face side, and a sliding portion 44 having a V groove 441, that extends in the y direction, is displaced at the right side of the rear face of the slider 4. An engaging piece disposed on one side of the strip-shaped receive element 135 is inserted into a concave portion 451 of a support piece 45 that is disposed adjacent to the sliding portion 44, and by a spring 62 that is wound between a pair of engaging pieces 135b disposed at the other side of the receive element 135, and a hook 46 disposed at the right side of the rear face of the slider 4, the sensor unit 1 is supported by the slider 4 so that sliding displacement in the y direction is possible. The operation of the ultrasonic linear actuator 13, having this configuration, is the same as the above mentioned ultrasonic linear actuator 22.

Figure 7A:
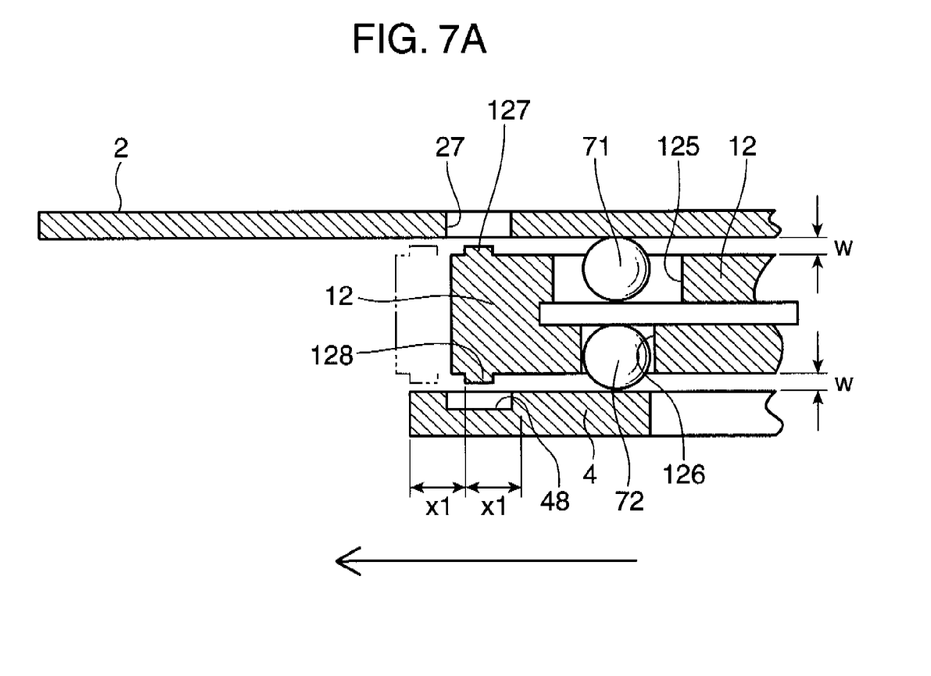
FIGS. 7A and 7B are diagrams depicting an inspection method for the image blur correction unit shown in FIG. 1.

In this way, one side of the holder 12 in the x direction and one side of the holder 12 in the y direction are supported, and a pair of balls 71 and 72 are disposed at the front and back on the side away from the supported sides (see FIG. 7A). Because of this, this holder 12 can be freely displaced by sliding on the stationary element 2 and the slider 4. In other words, the holder 12 can be freely displaced by sliding on the stationary element 2 using the ultrasonic linear actuator 22 and the ball 71, and can be freely displaced by sliding on the slider 4 by the ultrasonic linear actuator 13 and the ball 72. For this, a concave portion 125 for housing the ball 71 is formed at the front face side of the holder 12 facing the stationary element 2, and a concave portion 126 for housing the ball 72 is formed at the rear face side of the holder 12 facing the slider 4. The concave portion 125 is formed to be rectangular so as to allow displacement of the ball 71 on the stationary element 2 of the holder 12 in the x and y directions, and the concave portion 126 is formed to be an oval so as to allow displacement of the ball 72 on the slider 4 of the holder 12 in the y direction, whereby the holder 12 can be displaced ±0.5 mm, for example, in the x and y directions respectively.

The respective number of balls 71 and 72 may be two or more on each face of the holder 12. The balls 71 and 72 need not always be disposed at the front and back, forming a pair. However if a pair is formed at the front and back positions, the stationary element 2 and the slider 4 can hold the holder 12 in a balanced manner.

While the stationary element 2 and the slider 4 are connected between one side in the x direction and one side in the y direction by the ultrasonic linear actuators 22 and 13 and the springs 61 and 62, the stationary element 2 and the slider 4 are connected on the opposite side by the spring 63 between the hook 28 formed in the stationary element 2 and the hook 49 formed in the slider 4. The support portion 24 is disposed on the top end of the stationary element 2, and a pair of hooks 291 and 292 are disposed at the bottom end thereof. These hooks 291 and 292 are disposed so that the slider 4 and the sensor unit 1 do not fall off in the optical axis z direction (rear face direction) when a shock is applied.

In order to detect a displacement of the holder 12, a holder 129 for mounting a permanent magnet 6 is formed on the side face of the holder 12 that is the opposite side of the balls 71 and 72, and corresponding to this, a Hall element 7 that covers the mobile range of the holder 129 is disposed at the stationary element 2 side.

Figure 7B:
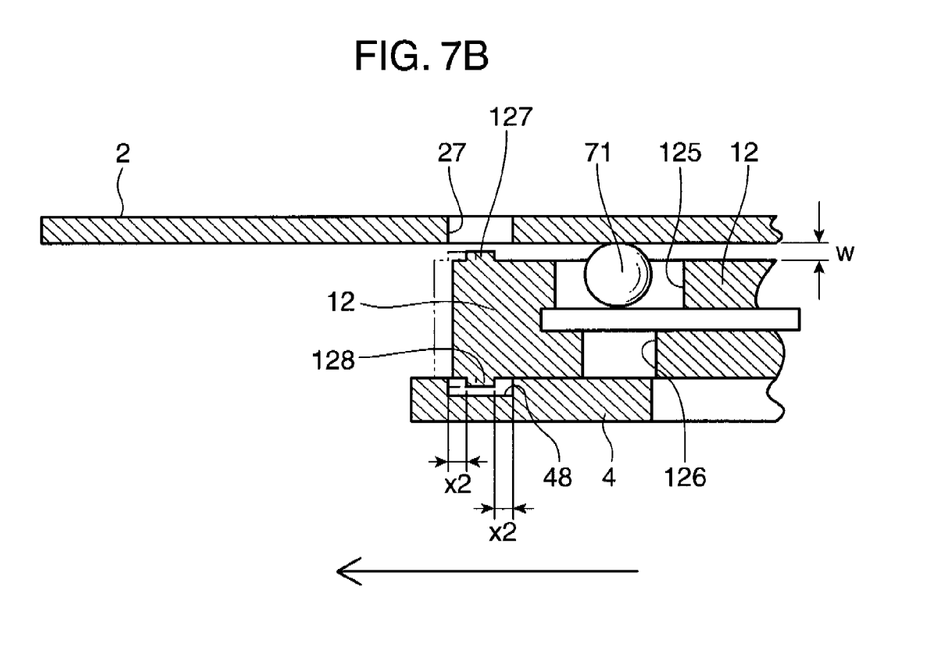

In the image blur correction unit having the above configuration according to the present embodiment, as shown in FIGS. 7A and 7B, each protrusion 127 and 128 is formed in the holder 12 near each concave portion 125 and 126 for housing each ball 71 and 72 respectively, and each concave portion 27 and 48 for each protrusion 127 and 128 is formed in the corresponding position of the stationary element 2 and the slider 4 respectively. The protrusions 127 and 128 may be disposed at the stationary element 2 and the slider 4 side, and the concave portions 27 and 48 may be disposed at the holder 12 side, that is opposite of the above mentioned configuration. FIGS. 7A and 7B are cross-sectional views (x and z cross-sections) near the balls 71 and 72. In the x and z cross-sectional views, the rectangular concave portion 125 looks wider than the oval concave portion 126, but in the y and z cross-sectional views, the width are approximately the same. These concave portions 125 and 126 are formed outside the mobile ranges of the balls 71 and 72.

According to the present embodiment, the heights of the protrusions 127 and 128 are lower than the width W between the holder 12, that is elevated from the stationary element 2 and the slider 4 respectively by the balls 71 and 72 that are inserted, and the stationary element 2 and the slider 4, and the inner dimensions of the concave portions 27 and 48 and the outer dimensions of the protrusions 127 and 128 are set so that the mobile range ±x2 of the protrusions 127 and 128, which fit in the concave portions 27 and 48 shown in FIG. 7B, become smaller than the mobile range ±x1 of the holder 4 shown in FIG. 7A. The mobile range ±x1 is a distance in which the holder 4 can be displaced in the left and right directions respectively from the home (neutral) position shown in FIG. 7A by the drive of the ultrasonic linear actuator 22, and is in a ±0.5 mm range, for example, as mentioned above. The mobile range in the y direction by the ultrasonic linear actuator 13 is also ±0.5 mm. The mobile range ±x2 of the protrusions 127 and 128 in the concave portions 27 and 48 is set to ±0.2 mm, for example.

Therefore in the case of omission of the ball 72 that occurred during assembly, as shown in FIG. 7B, if the protrusion 128 fits in the concave portion 48 by movement of the holder 12, the movement of the holder 12 hereafter is restricted to a range of ±x2, that is smaller than the normal mobile range ±x1, because of protrusion 128 and concave portion 48. As a result, the predetermined image blur correction performance (movement of the sensor unit 1) cannot be acquired in the inspection stage of the image blur correction unit 100, whereby the omission of the balls 71 and 72 that occurred during assembly can be detected, and the entry of defective products into subsequent steps can be prevented. In other words, the image blur correction unit 100 is inspected by driving the ultrasonic linear actuators 13 and 22 in the maximum mobile range, and it is judged whether a predetermined mobile distance can be acquired in the detection result of the Hall element 7. Therefore omission of the balls 71 and 72 that occurred during assembly can be detected at a much earlier stage, compared with an inspection step in a final stage, which can be performed only when all the wires, including the wire from the image sensing element 11, are connected.

FIG. 8 and FIG. 9 are perspective views of an imaging device comprising the image blur correction unit 100 having the above mentioned configuration and an imaging lens barrel 200, where FIG. 8 is a diagram when viewed from the top face side, and FIG. 9 is a diagram when viewed from the rear face side. This imaging device is comprised of the imaging lens barrel 200 and the image blur correction unit 100 which is housed in an enclosure of the main body, which is not illustrated, and the FPC 8 is extended from the imaging sensing device 11, the FPC 80 is extended from the ultrasonic linear actuators 13 and 22, and the FPC 201 is extended from the motor for zooming and the motor for focusing.

In general terms, in the imaging lens barrel 200, power from the motor for zooming 202 is transferred to a cam drum 205 housed in a stationary drum 204 via a gear box 203, a first linear moving drum 206 moves back and forth by rotation of the cam drum 205, and a front lens 207 is displaced in the optical axis z direction, and along with this, an internal linear moving drum, which is not illustrated, is also driven by the cam drum 205, and the zoom lens held by this linear moving drum is also displaced in the optical axis z direction. For focusing, a separate linear moving drum and a focusing lens that is held by this drum are disposed, and are driven by an compact internal motor.

Since an image correction unit 100, of which the balls 71 and 72 are not inserted during assembly, do not enter into the assembly steps of the imaging device, an imaging device of which defective generation rate is low can be implemented.

In the above description, the image blur correction unit 100 of the present embodiment is used for a camera of which lens cannot be exchanged, but may be used as a single lens reflex camera. The image blur correction unit 100 may also be used for an image blur correction unit that corrects an image blur by moving a lens in the imaging lens barrel. For the actuator, a voice coil motor, stepping motor or the like can be used instead of the ultrasonic linear actuators 13 and 22.

The specification discloses the aforementioned arrangements. The following is a summary of the primary arrangements of the embodiments.

An image blur correction device according to an aspect comprises: a base; an optical component that is inserted in an optical system; a holder that holds the optical component and is supported by one or more ball(s) so as to be freely displaced by sliding on the base; and an actuator that displaces the holder on the base, wherein the holder has one of a protrusion and concave portion near a housing position for the ball, the base has the other of the protrusion and the concave portion at a position that is outside the mobile range of the ball and that faces the protrusion or concave portion, the height of the protrusion is lower than the space between the holder, which is elevated from the base by the insertion of the ball, and the base, and the inner dimensions of the concave portion and the outer dimensions of the protrusion are set so that the mobile range of the protrusion fitted in the concave portion becomes smaller than the mobile range of the holder.

An image blur correction device according to another aspect is a device for optically correcting an image blur by displacing an optical component inserted in an optical system in a direction crossing the optical axis, wherein the optical component is supported by a holder, the holder is supported by an actuator for displacement and one or more balls so as to be freely displaced by sliding on a base, the holder has one of a protrusion and concave portion near a housing position of the ball, the base has the other of the protrusion and the concave portion at a position that is outside the mobile range of the ball, the height of the protrusion is formed to be lower than the space between the holder, which is elevated from the base by the insertion of the ball, and the base, and the inner dimensions of the concave portion and the outer dimensions of the protrusion are set so that the mobile range of the protrusion, being fit in the concave portion becomes smaller than the mobile range of the holder.

According to the image blur correction device having this configuration, a device for optically correcting the image blur due to hand motion can have a structure to detect an omission ball that occurred during assembly when the optical component, that is inserted into the optical system, such as a sensor or lens, is supported by the holder, and the holder is supported by an actuator for displacement, and a ball which is disposed at least in one location so as to be freely displaced by sliding on the base, by displacing the optical component in a direction crossing the optical axis so that the hand motion vibration can be cancelled. In concrete terms, one of the protrusion and the concave portion is disposed on the holder, near the housing position of the ball, and the other of the protrusion and the concave portion is disposed on the base at a position that is outside the mobile range of the ball and that faces the protrusion or the concave portion. The height of the protrusion is formed to be lower than the space between the holder, which is elevated from the base by insertion of the ball, and the base, and the inner dimensions of the concave portion and the outer dimensions of the protrusion are set so that the mobile range of the protrusion, being fitted in the concave portion, become smaller than the mobile range of the holder. Therefore if the ball is not inserted during assembly, movement of the holder, after the protrusion is fitted in the concave portion by the movement of the holder, is controlled to be in a narrower range than the normal mobile range.

Hence if a ball is not inserted during assembly, a predetermined image blur correction performance (movement of the unit) cannot be acquired in the inspection step of the image blur correction device. As a result, the omission of the ball that occurred during assembly can be detected, and entry of a defective product into subsequent steps can be prevented.

According to another aspect, in the image correction device, the base further comprises a first substrate that is fixed and a second substrate that holds the holder, with the holder being sandwiched therebetween, and the second substrate is configured so that the second substrate along with the holder can be displaced by sliding in a first direction on the first substrate, and is supported so that the holder can be displaced by sliding in a second direction that crosses with the first direction.

According to this configuration, when image blur correction is performed in both the first direction (e.g. x direction) and the second direction (e.g. y direction), the base that supports the holder so as to freely displaced by sliding, is constituted by the first substrate that is a stationary element disposed on one surface of the holder, and the second substrate that is disposed on the other face of the holder, and is constituted by a slider holding the holder by sandwiching the holder between the second and first substrates. Therefore the holder can be held by the two substrates in a balanced manner.

According to another aspect, in the above mentioned image blur correction devices, the actuator further comprises a first actuator that is disposed near the edge of the holder in the first direction, and a second actuator that is disposed near the edge of the holder in the second direction, the ball further comprises a first ball that is disposed between the first substrate and the holder, and a second ball that is disposed between the second substrate and the holder, and the first ball and the second ball are disposed in the holder on a side opposite the edge where the first actuator and the second actuator cross each other.

According to this configuration, the first and the second balls are disposed in the above mentioned positions, whereby the holder can be supported in a more balanced manner.

According to another aspect, in the above mentioned image blur correction devices, it is preferable that the actuator is an ultrasonic linear actuator.

According to this configuration, an ultrasonic linear actuator is used, whereby the torque required for the image blur correction can be acquired with a compact sized device.

According to another aspect, in the above mentioned image blur correction devices, it is preferable that the optical component is an image sensing element.

According to this configuration, the image blur can be corrected by displacing the image sensing element.

According to another aspect, it is preferable that the above mentioned image blur correction devices further comprises a tilt adjustment mechanism for performing tilt adjustment with respect to an optical axis of the optical system.

According to this configuration, tilt adjustment can be performed.

An imaging device according to another aspect comprises a lens unit having one or more lenses, and an image blur correction device for optically correcting the image blur of an image formed by the lens unit, and the image blur correction device is one of the above mentioned image blur correction devices.

In the imaging device having this configuration, the image blur correction device can be inspected before the assembly steps of the imaging device, so imaging devices of which defective generation rate is low can be implemented.

The present application is based on Japanese Patent Application No. 2009-36676, submitted on Feb. 19, 2009, of which content is included in the present application.

The present invention was described appropriately and sufficiently using the embodiments with reference to the drawings, but it should be recognized that an expert in the art could easily change and/or improve the above embodiments. Therefore unless a variant form or improved form embodied by an expert in the art is deviated from the scope of the claims described in What is Claimed Is, the variant form or improved form shall be interpreted to be included in the scope of the claims.

What is claimed is:

1. An image blur correction device, comprising:
a base;
an optical component that is inserted in an optical system;
a holder that holds the optical component and is supported by one or more balls so as to be freely displaced by sliding on the base; and
an actuator that displaces the holder on the base, wherein
the holder has one of a protrusion and a concave portion near a housing position for the one or more balls,
the base has the other of the protrusion and the concave portion at a position that is outside a mobile range of the one or more balls and that faces the protrusion or the concave portion,
a height of the protrusion is lower than the space between the holder, which is elevated from the base by the insertion of the one or more balls, and the base, and
inner dimensions of the concave portion and outer dimensions of the protrusion are set so that a mobile range of the protrusion fitted in the concave portion becomes smaller than a mobile range of the holder.

2. The image blur correction device according to claim 1, wherein
the base comprises a first substrate that is fixed, and a second substrate that holds the holder, with the holder being sandwiched therebetween, and
the second substrate is configured so that on the first substrate the second substrate along with the holder can be displaced by sliding in a first direction, and is supported so that the holder can be displaced by sliding in a second direction that crosses with the first direction.

3. The image blur correction device according to claim 2, wherein
the actuator comprises a first actuator that is disposed near an edge of the holder in the first direction, and a second actuator that is disposed near an edge of the holder in the second direction,
the one or more balls comprises a first ball that is disposed between the first substrate and the holder, and a second ball that is disposed between the second substrate and the holder, and
the first ball and the second ball are disposed in the holder on a side opposite the edge where the first actuator and the second actuator cross each other.

4. The image blur correction device according to claim 3, wherein the actuator is an ultrasonic linear actuator.

5. The image blur correction device according to claim 1, wherein the optical component is an image sensing element.

6. The image blur correction device according to claim 5, wherein
the base comprises a first substrate that is fixed, and a second substrate that holds the holder, with the holder being sandwiched therebetween, and
the second substrate is configured so that on the first substrate the second substrate along with the holder can be displaced by sliding in a first direction, and is supported so that the holder can be displaced by sliding in a second direction that crosses with the first direction.

7. The image blur correction device according to claim 6, wherein
the actuator comprises a first actuator that is disposed near an edge of the holder in the first direction, and a second actuator that is disposed near an edge of the holder in the second direction,
the one or more balls comprises a first ball that is disposed between the first substrate and the holder, and a second ball that is disposed between the second substrate and the holder, and
the first ball and the second ball are disposed in the holder on a side opposite the edge where the first actuator and the second actuator cross each other.

8. The image blur correction device according to claim 7, wherein the actuator is an ultrasonic linear actuator.

9. The image blur correction device according to claim 5, further comprising a tilt adjustment mechanism for performing tilt adjustment with respect to an optical axis of the optical system.

10. An imaging device, comprising:
a lens unit having one or more lenses; and
an image blur correction device for optically correcting an image blur of an image formed by the lens unit, wherein
the image blur correction device comprises:
a base;
an optical component that is inserted in an optical system;
a holder that holds the optical component and is supported by one or more balls so as to be freely displayed by sliding on the base; and
an actuator that displaces the holder on the base, wherein
the holder has one of a protrusion and a concave portion near a housing position of the one or more balls,
the base has the other of the protrusion and the concave portion at a position that is outside a mobile range of the one or more balls and that faces the protrusion or the concave portion,
a height of the protrusion is lower than a space between the holder, which is elevated from the base by the insertion of the one or more balls, and the base, and
inner dimensions of the concave portion and outer dimensions of the protrusion are set so that a mobile range of the protrusion fitted in the concave portion becomes smaller than a mobile range of the holder.

11. The imaging device according to claim 10, wherein
the base comprises a first substrate that is fixed, and a second substrate that holds the holder, with the holder being sandwiched therebetween, and
the second substrate is configured so that on the first substrate the second substrate along with the holder can be displaced by sliding in a first direction, and is supported so that the holder can be displaced by sliding in a second direction that crosses with the first direction.

12. The imaging device according to claim 11, wherein
the actuator comprises a first actuator that is disposed near an edge of the holder in the first direction, and a second actuator that is disposed near an edge of the holder in the second direction,
the one or more balls comprises a first ball that is disposed between the first substrate and the holder, and a second ball that is disposed between the second substrate and the holder, and
the first ball and the second ball are disposed in the holder on a side opposite the edge where the first actuator and the second actuator cross each other.

13. The imaging device according to claim 12, wherein the actuator is an ultrasonic linear actuator.

14. The imaging device according to claim 10, wherein the optical component is an image sensing element.

15. The imaging device according to claim 14, wherein
the base comprises a first substrate that is fixed, and a second substrate that holds the holder, with the holder being sandwiched therebetween, and the second substrate is configured so that on the first substrate the second substrate along with the holder can be displaced by sliding in a first direction, and is supported so that the holder can be displaced by sliding in a second direction that crosses with the first direction.

16. The imaging device according to claim 15, wherein the actuator comprises a first actuator that is disposed near an edge of the holder in the first direction, and a second actuator that is disposed near the edge of the holder in the second direction, the one or more balls comprises a first ball that is disposed between the first substrate and the holder, and a second ball that is disposed between the second substrate and the holder, and the first ball and the second ball are disposed in the holder on a side opposite the edge where the first actuator and the second actuator cross each other.

17. The imaging device according to claim 16, wherein the actuator is an ultrasonic linear actuator.

18. The imaging device according to claim 14, further comprising a tilt adjustment mechanism for performing tilt adjustment with respect to an optical axis of the optical system.

* * * * *